United States Patent [19]
Van Gestel

[11] Patent Number: 6,133,937
[45] Date of Patent: Oct. 17, 2000

[54] COMPATIBLE TRANSMISSION AND RECEPTION OF OPERATIONAL SIGNALS TO BE PROCESSED BY A RECEIVER

[75] Inventor: Henricus A. W. Van Gestel, Eindhoven, Netherlands

[73] Assignee: U.S. Philips Corporation, New York, N.Y.

[21] Appl. No.: 09/120,512

[22] Filed: Jul. 22, 1998

[30] Foreign Application Priority Data

Jul. 25, 1997 [EP] European Pat. Off. .............. 97202339

[51] Int. Cl.⁷ ....................................................... H04N 7/14
[52] U.S. Cl. ................................ 348/7; 348/10; 348/12; 348/13; 348/473; 455/5.1
[58] Field of Search ............................. 348/5.5, 6, 7, 10, 348/12, 13, 467, 468, 473, 476, 478; 455/3.1, 5.1, 4.2, 6.1, 6.2, 6.3

[56] References Cited

U.S. PATENT DOCUMENTS

| | | | |
|---|---|---|---|
| 5,357,276 | 10/1994 | Banker et al. ................................. | 348/7 |
| 5,446,919 | 8/1995 | Wilkins ....................................... | 455/6.2 |
| 5,565,909 | 10/1996 | Thibadeau et al. ........................... | 348/9 |
| 5,565,927 | 10/1996 | Van Gestel ................................. | 348/467 |
| 5,684,541 | 11/1997 | Vaske ........................................ | 348/461 |
| 6,016,158 | 1/2000 | Mackinnon .................................. | 348/7 |

*Primary Examiner*—Andrew I. Faile
*Assistant Examiner*—Sam Huang
*Attorney, Agent, or Firm*—Edward W. Goodman

[57] ABSTRACT

There exists a problem of backwards compatibility and future proofness of data transmission systems and, more particularly, interactive television broadcast transmissions. In view hereof, service providers must take into account that their service is to be processed by receivers having different capabilities. To this end, operational signals for different receiver types are identified by respective level data (operation_level) defining which receiver capabilities are required to perform the operation. Two operation levels (full_operation_level and minimum_operation_level) are sufficient. More levels can be defined by means of chaining techniques. In a practical embodiment, a plurality of operations is packed in a transmission block. Events (e.g., user actions) are represented by an index to the list, the index depending on whether the receiver has full or minimal capabilities.

20 Claims, 2 Drawing Sheets

COMPATIBLE TRANSMISSION AND RECEPTION OF OPERATIONAL SIGNALS TO BE PROCESSED BY A RECEIVER

BACKGROUND OF THE INVENTION

1. Field of the Invention

The invention relates to a method of transmitting operational signals to a receiver, the operational signals representing operations to be performed by the receiver, and including first operational data for receivers capable of performing first operations, and further operational data for receivers capable of performing further operations. The invention also relates to a method and arrangement for receiving and processing said operational signals.

2. Description of the Related Art

An example of a known method of transmitting operational signals as defined in the opening paragraph is the transmission of "level 2 or higher" teletext in accordance with the well-known World System Teletext standard. Briefly summarized, this teletext transmission allows teletext pages to be displayed in a display format that does not suffer from the restrictions of the basic "level 1" format. For example, whereas level-1 teletext transmissions allow the color of text on screen to be changed in spaces between words only, level-2 transmissions can assign different colors to individual characters of a word if, of course, the relevant receiver has the capability of displaying pages in the higher level format.

Enhancing an existing service such as teletext imposes a compatibility problem. In the above prior art, backwards compatibility is achieved in that the broadcasters compose a sensible level-1 page first, and then extend said page with further operational data defining the enhancements in accordance with the level-2 format and being ignored by level-1 receivers.

The invention is not restricted to teletext transmissions. It is envisaged that other emerging data services will increasingly suffer from the above-mentioned compatibility problem. A particular example of a service to which the invention applies is interactive television program broadcasting. In interactive television, operational signals are transmitted along with the television program which allow a user to submit his opinion about the program contents to the broadcaster, or even influence the course of the program. For example, the user may press a certain key of his remote control unit to express which one of the candidates Debbie, Anne or Laurie, is to win the Miss World contest which is being broadcast. In response to the user's choice, a receiver having a backwards channel performs a corresponding operation, for example, dialling a first telephone number for Debbie, a second telephone number for Anne and a third telephone number for Laurie. While the feature of calling a predetermined telephone number may be an established capability of existing receivers, newer receivers may have enhanced capabilities which the broadcaster may like to exploit.

SUMMARY OF THE INVENTION

It is an object of the invention to provide a method of transmitting operational signals, such that receivers having different capabilities perform different operations.

To this end, the method in accordance with the invention is characterized in that it comprises the step of transmitting level data defining first and further capabilities required to perform said first and further operations respectively. In the Miss World contest example, this allows the broadcaster to control one type of receiver (e.g., receivers having a backwards channel only) to call a respective telephone number, whereas another type of receiver (e.g., receivers having also a chip card reader) can be controlled to call a different telephone number for establishing a bidirectional communication with a processing system that is arranged to debit an amount from the chip card in turn for crediting a large amount to every n-th caller.

DESCRIPTION OF THE PREFERRED EMBODIMENTS

Figure 1:
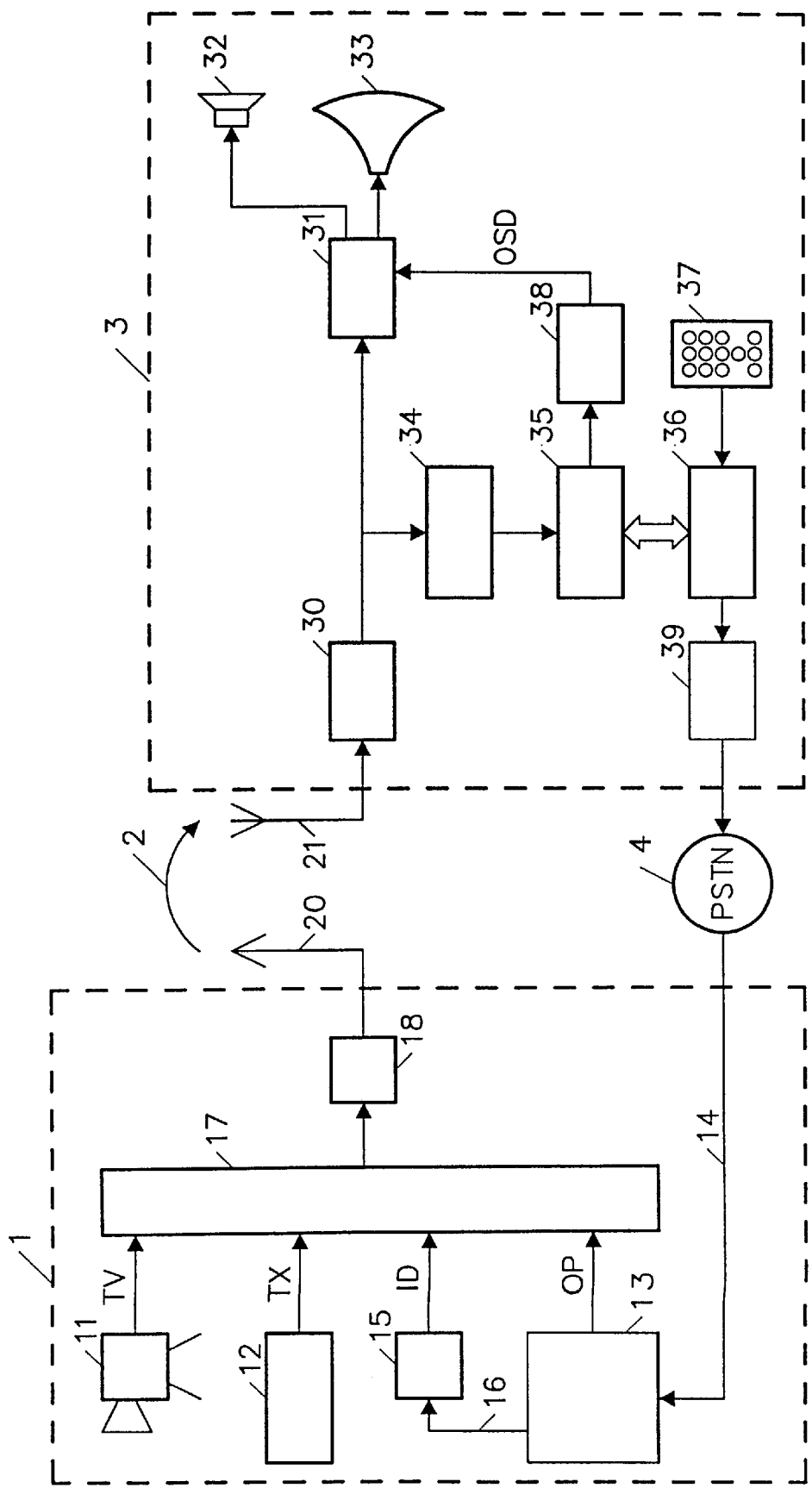
FIG. 1 shows a system comprising a transmitter and a receiver in accordance with the invention.

The invention will be described with reference to an interactive television transmission system which is shown in FIG. 1. The system comprises a television transmitter 1, a broadcast channel 2, an interactive television receiver 3 and a backwards channel 4. The broadcast channel 2 may also be a storage medium such as a magnetic tape or optical disk on which a television program is stored. The backwards channel is here assumed to be the public switched telephone network (PSTN).

The transmitter 1 comprises a television program signal source which is here shown as a television camera 11 generating a conventional television signal TV. The transmitter further comprises a teletext generator 12 which generates a teletext signal TX in a conventional manner, i.e., using lines in the vertical blanking interval of the television signal. A computer system 13 generates operational signals OP defining operations to be performed by the receivers. For example, the operational signals define a telephone number to be called by the receivers, identify how a user's response is to be encoded in the telephone call, and specify a time interval during which answers may be given. The operational signals are transmitted in a teletext-like manner in the vertical blanking interval of the television signal. In this embodiment, the operational signals relating to an event in the television program are accommodated packed in teletext pages having a hexadecimal page number, hereinafter also referred to as Event Information Structure (EIS) packets.

In order to receive the phone calls from the public, the computer system 13 is coupled to the public switched telephone network 4 through telephone connections 14. The transmitter further comprises means 15 for generating an identification signal ID which indicates that an interactive television program is being broadcast. The means 15 are controlled by the computer system 13 through a connection 16. The television signal TV, teletext signal TX, identification signal ID, and operational signals OP are combined in a combiner stage 17, and collectively applied to a modulator 18 for RF transmission via an antenna 20.

The receiver 3 comprises an antenna 21 and a tuner 30. The tuner applies the demodulated baseband signal to conventional audio and video processing circuitry 31 to reproduce the television program through a loudspeaker 32 and a display screen 33. The baseband signal is further applied to a data slicer 34 which extracts the data embedded in the vertical blanking interval of the signal and stores said data in a buffer section of a memory 35. The memory 35 is coupled to a microprocessor 36 which receives user commands from a (remote) control unit 37 and is further coupled, via a modem 39, to the telephone network 4. The memory 35 also includes a display section. Data stored in this display section by the microprocessor 36 is converted into on-screen-display signals OSD by generator 38 for display on the screen 33. It will be appreciated that the microprocessor may also generate an audible signal in this manner, and apply it to the loudspeaker 32.

Figure 2:
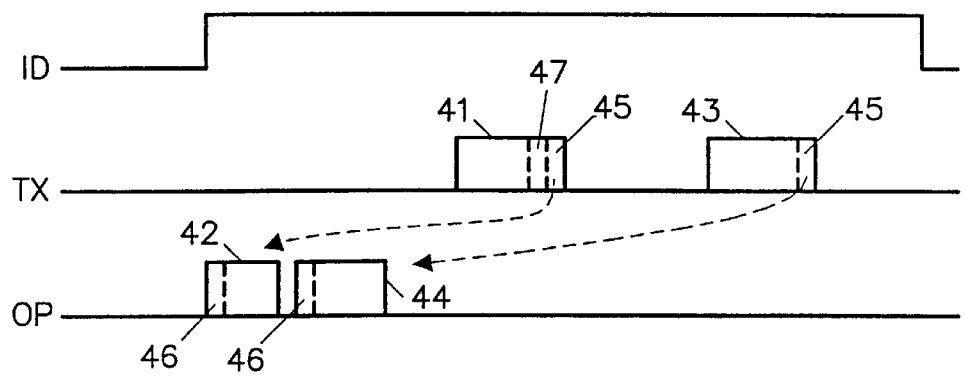
FIG. 2 shows a timing diagram to illustrate the operation of the system which is shown in FIG. 1.

FIG. 2 shows a timing diagram to illustrate the transmission of the signals ID, TX and OP during the television program broadcast. For reasons of clarity, the signals are separately shown although they are transmitted through the same physical medium, viz. as teletext data in the vertical blanking interval. The waveform denoted ID indicates the period of time during which the interactive television program is being broadcast. The waveform denoted TX denotes the transmission of messages being presented to the user and allowing him to participate in the program. Two messages 41 and 43 are shown in the Figure. The waveform denoted OP denotes the transmission of Event Information Structure (EIS) packets carrying operational signals. Two EIS-packets 42 and 44 are shown in the Figure. For the sake of completeness, it is to be noted that conventional teletext pages are also transmitted. They are not shown in the Figure.

The transmission of display messages 41 and 43 is synchronized with events in the interactive television program. As has been attempted to show in FIG. 2, the operational signals associated with an event are transmitted in advance, before (possibly shortly before) the event occurs. In the present example, EIS-packet 42 is associated with display message 41, i.e., it defines the operations to be performed in response to receiving the display message 41. EIS-packet 44 defines the operations to be performed if the user responds to display message 42. The associations between display messages and the corresponding EIS-packets are denoted by arrows and is achieved by providing each display message with a link address 45 to the address 46 of the associated EIS-packet.

Like some other known digital transmission systems (e.g., the video coding standard MPEG), the system in accordance with the invention is specified in terms of the syntax of the transmitted signals. This syntax will now be described first. Many aspects of the invention will already become apparent from this description.

Table I shows the syntax of the operational signals OP which are accommodated in the EIS-packets:

TABLE I

| Event Information Structure | No. of Bits |
|---|---|
| application_type | 6 |
| structure_size | 10 |
| control_block_size | 10 |
| structure_type | 6 |
| structure_no. | 8 |
| A_A_P_length | 8 |
| Access_Authorization_Pattern | variable |
| specification_version | 8 |
| full_operation_level | 16 |
| minimum_operation_level | 16 |
| descriptor_looplength | 6 |
| for(k=0; k<descriptor_looplength; k + + ) | |
| short_page_reference | 15 |
| descriptor_type | 6 |
| descriptor_id | 8 |
| descriptor_eval | 8 |

TABLE I-continued

| Event Information Structure | No. of Bits |
|---|---|
| event_looplength | 6 |
| for(k=0; k<event_looplength; k + + ) | |
| event_id | 8 |
| reaction_index | 8 |
| fallback_reaction_index | 8 |
| reaction_blocksize | 8 |
| reaction_block | variable |

The parameters in this syntax have the following definition:

application_type defines the type of application. Interactive television, one of the application types, is coded as 01.

structure_size gives the length of the structure in bytes.

control_block_size indicates the quantity of control data, including any fill_up bits, within the structure. The unit of measurement is the number of control bits) divided by 8. Thus a value N indicates the presence of 8N control bits.

structure_type is a pre-defined identifier of the current data structure. It allows different data structures to be distinguished. The structure_type value for the event information structure is 01.

structure_no is a number which is unambiguously linked with one instance of a data structure.

A_A_P_length defines the length of the Access_Authorization_Pattern in bytes.

Access_Authorization_Pattern is an encoded presentation of an ITV Logo. The ITV logo will be displayed whenever the rTV application is activated. Further details and applications of the logo are described in Applicant's non-published European Patent Application 97200944.3, corresponding to U.S. patent application Ser. No. 09/046,033, filed Mar. 23, 1998 (PHN 16.288).

specification_version indicates which version of the ITV specification the downloaded application applies to.

full_operation_level defines the receiver capabilities that are required for full operation of the application. Each bit or combination of bits denotes a given capability. For example (D0 . . . D15 denote the 16 bits of the parameter):
D0: point-and-click device needed
D1: video freeze option needed
D2: backchannel (telephone line) needed
D3: card reader device needed
D4 . . . D15: reserved for future use minimum_operation_level defines the minimal receiver capabilities that are required for a minimal but still useful operation of the application. The definition is the same as above.

descriptor_looplength specifies the length of the following loop with descriptors. In essence, a descriptor is a pointer to a description structure.

short_page_reference is a short reference to a teletext page. It comprises the page number (11 bits) and the units field of the subcode (4 bits). The rest of the subcode is considered as "don't care".

descriptor_type is the type of the descriptor attached to the structure.

descriptor_id is the identification of the descriptor attached to the structure.

descriptor_eval gives information on how to evaluate the descriptor attached to the structure. The evaluation behavior is correlated with the descriptor type.

event_looplength specifies the length of the following loop with event/reaction combinations.

event_id identifies an event. An event is a user-operable action such as the pressure of a key or a point-and-click operation. An event may also be an autonomous response of the receiver to a request received from the receiver. When such a user-operable action or receiver-response matches the event_id, an associated operation will be performed. The event_ids are mentioned in ascending order. Subsequent occurrences with the same event_id value will be ignored. A list of event_ids will be given below in Table II.

reaction_index is an index into a reaction_block and points to operational signals to be performed. The reaction_index will be used under the condition that the decoder capabilities are up to the capabilities presented in full_operation_level. The index is specified in bytes.

fallback_reaction_index is a further index into the reaction_block. The fallback_reaction index will be used under the condition that the decoder capabilities are up to the capabilities presented in minimum_operation_level, but not up to the capabilities presented in full_operation_level. Thus, receivers capable of the minimum operation level but not the full operation level will use the fallback reaction, if provided.

reaction_blocksize gives the length of the following reaction_block in bytes.

reaction_block is a list of reactions, i.e., operations to be performed by the receiver. The reaction_block will be described below in more detail in Table III.

As mentioned above, an event is a user-operable action (such as the pressure of a key or a point-and-click operation) or an autonomous response of the receiver to a request received from the receiver. A number of events have been defined and have been assigned an event_id. Table II shows the list of even_id definitions:

TABLE II

| Event_id | Description |
| --- | --- |
| 00 | digit 0 pressed |
| 01 | digit 1 pressed |
| 02 | digit 2 pressed |
| 03 | digit 3 pressed |
| 04 | digit 4 pressed |
| 05 | digit 5 pressed |
| 06 | digit 6 pressed |
| 07 | digit 7 pressed |
| 08 | digit 8 pressed |
| 09 | digit 9 pressed |
| 0A | key * pressed |
| 0B | key # pressed |
| 0C-11 | reserved for future use |
| 12 | key Ok pressed (for entire screen) |
| 13 | key Ok pressed (within hotspot) |
| 14 | highlight entered the hotspot (selection) |
| 15 | highlight leaves the hotspot (deselection) |
| 16 | "start interactive TV" pressed |
| 17 | "stop interactive TV" pressed |
| 18 | checked to be fully capable |
| 19 | checked to be minimal capable |
| 1A | checked to be incapable |

TABLE II-continued

| Event_id | Description |
| --- | --- |
| 1B-7F | reserved for future use |
| 80-FE | soft events |
| FF | finished |

Most of the events in Table II speak for themselves. For the sake of completeness, it is mentioned that a hotspot is a rectangular area on the screen which can be activated by a point-and-click device. The events having event_id 18 (checked to be fully capable), 19 checked to be minimally capable) and 1A (checked to be incapable) are examples of events representing an autonomous response of the receiver to a transmitted signal rather than a user-operable action. Their purposes will be described later with reference to a specific embodiment of the invention.

The reaction_block in an EIS-packet is a concatenation of single, separated reactions. A reaction is herein understood to mean an operation to be performed by the receiver. A desired reaction (i.e., receiver operation) is indexed by a reaction_index which is an offset from the start of the reaction_block and is given in bytes. Therefore, each single reaction will start at a byte boundary.

Reactions may have parameters. For most reaction types, the list of parameters is defined. For some reaction types, the parameter list is defined by a length parameter.

The reaction_block data is EX-ORed on a bit-by-bit basis with a repeated bit-pattern presented by Access-Authorization-Pattern. For this purpose, the repeated pattern was such a length that it matches the length of the reaction_block, as presented by reaction_blocksize.

Each reaction is encoded as a byte, denoted reaction_type. Table III shows the list of reaction_types which are defined for interactive television applications (parameters are shown between brackets):

TABLE III

| Reaction type | Description |
| --- | --- |
| 00 | reserved |
| 01 | sequence of reactions (length)(list of reaction indexes) |
| 02 | Show txt page (CNI)(full_page_reference) |
| 03 | Show object (origin)(object id) |
| 04 | Show HTML page (short_page_reference)(struct_id) |
| 05 | Activate input object (origin)(object id) |
| 06 | Run MHEG appl. (short_page_reference)(struct_id) |
| 08 | Connect telephone number (country.city.local) |
| 09 | Request telephone number (connect type)(time)(country.city.local) |
| 0A | Connect internet site (URL type)(URL) |
| 0B | Connect pre-defined server () |
| 0C | Start interaction protocol (protocol type) |
| 0D | Close_connection () |
| 0E | On_Error_Break (reaction_idx) |
| 0F | On_Error_Continue (reaction_idx) |
| 10 | Transmit x,y of pointing device (origin) |
| 11 | Transmit user identification code (); e.g. zip code, tel.number. |
| 12 | Transmit full user name and address () |
| 80-FE | Generate_soft_event (short_page_reference)(structure_id)(event_id.) |
| FF | No_reaction() |

More details of some reactions are given below:

Sequence_of_reactions provides a method to create a macro of reactions in response to an event. The reaction comprises a variable number of parameters, each referring to one reaction. The number of parameters is defined by the parameter length. The reactions will be executed in the order of the sequence, unless otherwise specified.

Show_txt_page provides a method of navigating from one display page to another display page. Each display page can present different choices to the user and give feedback on a previous choice when needed. The parameter CNI (Country Network Identification) identifies the broadcaster transmitting the page. When the identification is different from the current broadcaster, the control over the navigation is lost and should be recovered by the target broadcaster. This option is not very useful for ITV services but, when considered in a teletext environment, this feature is quite strong and useful. The parameter full_page_reference provides the full teletext page address, i.e., Magazine, Page Tens, Page Units and 4-digit Subcode, coded as defined in the World System Teletext specification.

Request_telephone_number establishes a telephone connection which is automatically closed after the relevant data has been transferred. The parameter connect_type indicates whether the telephone number is to be dialled immediately or with a given (possibly random) delay. The parameter time specifies a time interval during which the receiver may attempt to get an open line.

Generate_soft_event provides a method to fire a soft_event. This soft event can be located in another structure, coded on another page, providing a method to link reactions over the structure boundary. The location of the structure containing the addressed soft_event is given by the first parameter.

page_reference. The structure containing the addressed soft event is given by the second parameter structure_id. The event_id of the addressed soft event is given by the third parameter.

An example of an interactive television broadcast will now be described. The television program is supposed to be a Miss World contest in which the public may participate by choosing its favorite candidate. To this end, the user must press the digit "1" on his remote control unit to express his preference for Debbie, "2" for Anne and "3" for Laurie. Receivers having a backwards channel (also known as "backchannel") only are controlled to call a respective telephone number. Receivers having also a chip card reader are controlled to call a different telephone number. By calling the latter number, an amount will be debited from the chip card. In return, the service provider credits a large amount to every n-th caller.

With reference to FIG. 1, display message 43 defines a sub-image presenting the various options to the user. The display message includes a link 45 to EIS-packet 44 which is formatted in accordance with Table I. The parameters in the EIS-packet, as far as relevant for describing this example, are:

| full_operation_level: 0C minimum_operation_level: 04 | | |
|---|---|---|
| event_id: | reaction_index: | fallback_reaction_index: |
| 01 | 4 | 1 |
| 02 | 5 | 2 |
| 03 | 6 | 3 |
| reaction_block: | 08 (0800-55511) | |
| | 08 (0800-55512) | |
| | 08 (0800-55513) | |
| | 08 (0800-55521) | |

| -continued | |
|---|---|
| full_operation_level: 0C minimum_operation_level: 04 | |
| 08 (0800-55522) | |
| 08 (0800-55523) | |

In view of the foregoing description, it will be appreciated that the above EIS-packet has to be interpreted as follows:

The (hexadecimal) value 0C of full_operation_level (bits D2 and D3 are 1) specifies that the receiver must have both a backchannel and a card reader for a full operation of the service.

The value 04 of minimum_operation_level (only bit D2 is 1) specifies that the receiver must have a backchannel for a minimal operation of the service.

The reaction_block specifies six receiver actions, all having reaction_type value 08 which defines that a telephone number is to be called (see Table III). The telephone numbers (0800-555x) are different as has been expressed by the respective parameters.

If the user responds by pressing the digit "1" (i.e., an event occurs having event_id value 01), and the receiver has a backchannel as well as a card reader, the fourth item (reaction_index=4) of the reaction_block is selected. That is, the telephone number 0800-55521 is dialled. However, if the receiver has a backchannel only, the first item (fallback_reaction_index=1) of the reaction_block is selected. That is, the telephone number 0800-55511 is dialled.

Similarly, if the user responds by pressing the digit "2", the receiver performs the fifth (reaction_index=5) or second (fallback_reaction_index=2) of the reaction_block. Accordingly, the receiver dials 0800-55522 or 0800-55512 depending on whether he has a card reader.

If the user presses "3", the receiver dials 0800-55523 if a card reader is available, or 0800-55513 if only a backchannel is available.

In this example, the telephone numbers 0800-5551x give access to a computer system which merely accepts all calls and counts them. The telephone numbers 0800-5552x give access to a different computer system which also debits a certain amount from the receiver's chip card and credits an amount to the chip card of each 10th calling receiver.

A receiver not having the minimal capabilities defined by minimum_operation_level ignores the operational signal. The service provider should avoid such a situation. This is achieved in a further embodiment of the invention in which the transmitter transmits a request to the receiver to check its capabilities. This request is referred to as check_for_capability and is accommodated in a display message. In FIG. 2, it is accommodated in display message 41 and therein denoted by reference numeral 47. In response to the request, the receiver checks its capabilities against the required capabilities which are defined by full_operation_level and minimum_operation_level in the associated EIS-packet (42 in this example, see FIG. 2). Like a user-operable action such as pressing a digit, the result of this evaluation is an event. Accordingly, event_ids have been assigned to the result of the evaluation. As shown in Table II, they have the values 18 (checked to be fully capable), 19 (checked to be minimally capable) and 1A (checked to be incapable). Accordingly, a receiver operation can be assigned to the result of the evaluation in the same manner as described hereabove for a user-operable action. For example, a message can be shown to inform the user that his receiver is not capable of handling the present interactive television program (reaction_type 02 in Table III: show a teletext page). The receiver is preferably arranged to evaluate a check_for_capability request before displaying the message in which the request is accommodated.

Although the syntax provides only two operation levels (full and minimal), a plurality of different receiver types can be controlled by chaining plural display messages associated with different EIS-packets. To illustrate this, it will be assumed that one of the Miss World candidates can be further selected by pointing-and-clicking a respective part of the broadcast video image showing the three candidates. This feature requires a receiver to have a cursor device (bit D0 of operation_level.

In this example, a first display message inviting the user to choose his favorite candidate by a point-and-click operation and a second display message indicating that he may press "1", "2" or "3" are transmitted in that order. The first display message includes the check_for_capability request. The associated EIS-packet has the following data:

| | full_operation_level: 0D minimum_operation_level: 04 | |
|---|---|---|
| event_id: | reaction_index: | fallback_reaction_index: |
| 13 | 4 | 1 |
| 18 | 1 | 1 |
| 19 | 2 | 1 |
| 1A | 3 | 1 |
| reaction_block: | FF | |
| | 02($n_1$) | |
| | 02($n_2$) | |
| | 01,08(0800-55530),10(x,y) | |

The value 0D of full_operation_level in this example specifies that, for a full operation, the receiver must have a point-and-click device (bit D0=1), a backchannel (bit D2=1) and a card reader (bit D4=1). Before displaying the first message, the receiver checks whether it has these capabilities and returns, in response thereto, an event_id 18, 19 or 1A.

If the event_id is 18 (the receiver is fully capable, see Table II), the reaction_index 1 points to the first item in the reaction_block which is encoded as FF (No reaction, see Table III). The receiver now awaits a further event, for example, a point-and-click operation.

If the event_id is 19 (the receiver is minimally capable), the reaction_index 2 points to the second item in the reaction_block which causes the receiver to acquire and display the second display message having page number $n_1$ (reaction_type 02, see Table III). A different EIS-packet is associated with this second display message. It allows the user to select a candidate by pressing a digit in a manner as described hereinbefore.

If the event_id is 1A (the receiver is incapable), the reaction_index 3 points to the third item in the reaction_block which causes the receiver to acquire and display a further display message having page number $n_2$. This page is assumed to alert the user that his receiver is not capable of dealing with the service.

If the receiver is fully capable and the Ok key is pressed after the user has made a selection (event_id 13, see Table II), the fourth item of the list of operations is performed. This item is a sequence of operations (reaction_type 01), comprising a call (reaction_type 08) to telephone number 0800-55530 and the transmission of the cursor coordinates (reaction_type 10) to that number.

The check_for_capability feature thus allows a service provider to direct receivers to that part of the application that is most suited for the available capabilities.

Figure 3:
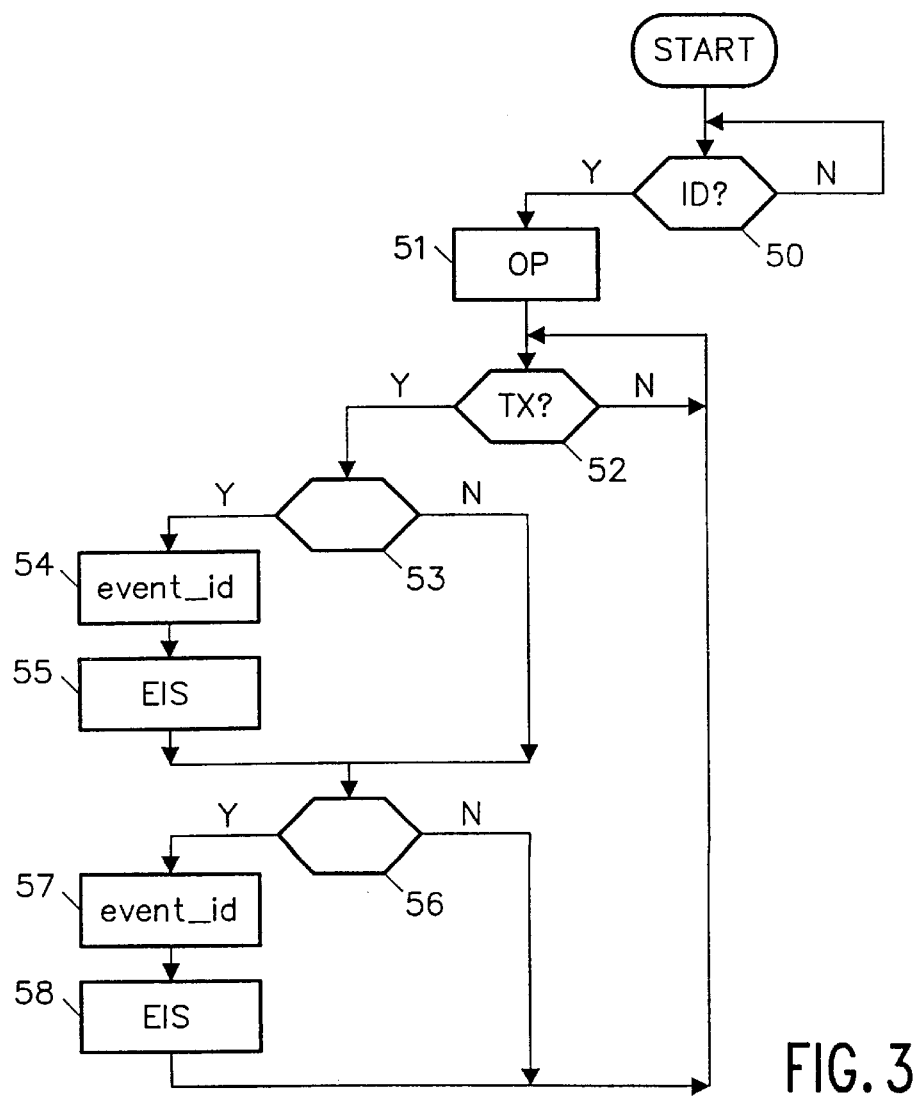
FIG. 3 shows a flowchart of operations performed by the receiver which is shown in FIG. 1.

The operation of the receiver 3 (see FIG. 1) will now be described with reference to FIG. 3 which shows a flowchart of operations performed by microprocessor 36. In a step 50, it is determined whether the broadcast television program is an interactive program by checking the ID signal. If that is the case, the receiver is controlled, in a step 51, to acquire and store the operational signals OP as soon as they are received. In a step 52, the reception of display messages TX is awaited. Upon reception of such a display message, the processor determines, in a step 53, whether the display message includes a request check_for_capability (47 in FIG. 2). If that is the case, a step 54 is carried out in which the processor retrieves the EIS-packet which is associated with the display message and has already been acquired in the step 51, reads the full and minimum operation level accommodated therein and determines the relevant event_id (fully capable, minimally capable or incapable, see Table II). In a step 55, the operational signals OP associated with said event are performed in accordance with Tables I and III. Note that this may involve the acquisition of another display message, in which case the processor returns to the step 52 to acquire this message. Otherwise, the processor proceeds to step 56.

In the step 56, the processor awaits detection of user-operable actions, such as the pressure of a key or a point-and-click operation. A step 57 is then carried out in which the processor assigns an event_id to said action in accordance with Table II. Then, in a step 58 which is similar to step 55 described above, the operational signals OP associated with the event are performed. Hereafter, or when a new message is received before a user action is detected, the processor returns to the step 52 to display a new message.

In summary, the invention addresses the problem of backwards compatibility and future proofness of data transmission systems and, more particularly, interactive television broadcast transmissions. In view hereof, service providers must take into account that their service is to be processed by receivers having different capabilities.

To this end, operational signals for different receiver types are identified by respective level data (operation_level) defining which receiver capabilities are required to perform the operation. Two operation levels (full_operation_level and minimum_operation_level) are sufficient. More levels can be defined by means of chaining techniques. In a practical embodiment, a plurality of operations is packed in a transmission block. Events (e.g., user actions) are represented by an index to said list, the index depending on whether the receiver has full or minimal capabilities.

What is claimed is:

1. A method of transmitting operational signals to a receiver, the operational signals representing operations to be performed by the receiver in response to respective events, the method comprising the steps:

transmitting first operational data representing first operations for receivers capable of performing said first operations;

transmitting level data defining capabilities required to perform said first operations;

transmitting further operation data representing alternative operations for receiver not capable of performing said first operations; and transmitting event data defining one or more events and identifying, for each event, which one of said first operations must be performed if the receiver has the capabilities required to perform said first operations, and which one of said alternative operations must be performed if the receiver does not have the capabilities required to perform said first operations.

2. The method as claimed in claim 1, wherein said method further comprises the step:

transmitting further level data defining further capabilities required to perform said alternative operations.

3. The method as claimed in claim 1, wherein said event data denotes user-operable actions.

4. The method as claimed in claim 1, further comprising the step:

transmitting a request to the receiver to identify whether the receiver fulfills said capabilities, wherein said event data denotes a response of the receiver to said request.

5. The method as claimed in claim 3, wherein said operational data is transmitted along with an interactive television program and defines operations to be performed using a return channel in response to said user-operable actions.

6. A transmitter for transmitting operational signals to a receiver, the operational signals representing operations to be performed by the receiver in response to respective events, the transmitter comprising:

means for transmitting first operational data representing first operations for receivers capable of performing said first operations;

means for transmitting level data defining capabilities required to perform said first operations;

means for transmitting further operational data representing alternative operations for receivers not capable of performing said first operations; and means for transmitting event data defining one or more events and identifying, for each event, which one of said first operations must be performed if the receiver has the capabilities required to perform said first operations, and which one of said alternative operations must be performed if the receiver does not have the capabilities required to perform said first operations.

7. A method of processing operational signals received from a transmitter, the operational signals representing operations to be performed by a receiver in response to respective events, said method comprises the steps:

receiving first operational data representing first operations for receiver capable of performing said first operations;

receiving level data defining capabilities required to perform said first operations;

determining whether the receiver fulfills said capabilities;

receiving further operational data representing alternative operations for receiver not capable of performing said first operations;

receiving event data defining one or more events and identifying, for each event, which one of said first operations, and which one of said alternative operations must be performed if the receiver does not have the capabilities required to perform said first operations; and if one of said events occurs, performing the respective first or alternative operations depending on the result of said determining step.

8. The method as claimed in claim 7, wherein said local event data is a user-operable action.

9. The method as claimed in claim 7, wherein said method further comprises the steps:

identifying, in response to a received request, whether the receiver fulfills said capabilities; and generating a local event representing the result of said identifying step.

10. A receiver for processing operational signals received from a transmitter, the operational signals representing operations to be performed by the receiver in response to respective events, the receiver comprising:

means for receiving first operational data representing first operations for receivers capable of performing said first operation;

means for receiving level data defining capabilities required to perform said first operations, respectively;

means for determining whether the receiver fulfills said capabilities;

means for receiving further operational data representing alternative operations for receivers not capable of performing said first operations;

means for receiving event data defining one or more events and identifying, for each event, which one of said first operations must be performed if the receiver has the capabilities required to perform said first operations, and which one of said alternative operations must be performed if the receiver does not have the capabilities required to perform said first operations; and means for performing the one first or alternative operation depending on the determining means.

11. The receiver as claimed in claim 10, wherein said receiver further comprises:

means for receiving further level data defining further capabilities required to perform said alternative operations.

12. The transmitter as claimed in claim 6, wherein said transmitter further comprises:

means for transmitting further level data defining further capabilities required to perform said alternative operations.

13. The transmitter as claimed in claim 6, wherein said event data denotes user-operable actions.

14. The transmitter as claimed in claim 6, wherein said transmitter further comprises:

means for transmitting a request to the receiver to identify whether the receiver fulfills said capabilities, wherein said event data denotes a response of the receiver to said request.

15. The transmitter as claimed in claim 13, wherein said operational data is transmitted along with an interactive television program and defines operations to be performed using a return channel in response to said user-operable actions.

16. The method as claimed in claim 8, wherein said operational data is received along with an interactive television program and defines operations to be performed by the receiver using a return cannel in response to said user-operable action.

17. The method as claimed in claim 7, wherein said method further comprises the step:

receiving further level data defining further capabilities required to perform said alternative operations.

18. The receiver as claimed in claim 10, wherein said event data denotes user-operable actions.

19. The receiver as claimed in claim 18, wherein said operational data is transmitted along with an interactive television program, wherein the receiver further comprises:

a return channel for returning signals to the transmitter in response to user-operable actions;

input means for receiving user-operable actions; and means for performing a selected one of said operations which is identified by event data corresponding to a user-operable action.

20. The receiver as claimed in claim 10, wherein said receiver further comprises:

means for receiving a request for the receiver to identify whether the receiver is capable of fulfilling said capabilities, wherein said event data denotes a response of the receiver to said request.

* * * * *